(12) United States Patent
Wakita et al.

(10) Patent No.: US 7,030,190 B2
(45) Date of Patent: Apr. 18, 2006

(54) THERMOPLASTIC RESIN COMPOSITION MATERIAL AND FORMED ARTICLE COMPRISING SAID MATERIAL

(75) Inventors: Naoki Wakita, Himeji (JP); Hiroaki Arita, Himeji (JP)

(73) Assignee: Daicel-Degussa Ltd., Tokyo (JP)

( * ) Notice: Subject to any disclaimer, the term of this patent is extended or adjusted under 35 U.S.C. 154(b) by 229 days.

(21) Appl. No.: 10/250,509

(22) PCT Filed: Feb. 26, 2002

(86) PCT No.: PCT/JP02/01693

§ 371 (c)(1),
(2), (4) Date: Jul. 3, 2003

(87) PCT Pub. No.: WO02/068536

PCT Pub. Date: Sep. 6, 2002

(65) Prior Publication Data

US 2004/0054084 A1   Mar. 18, 2004

(30) Foreign Application Priority Data

Feb. 28, 2001   (JP) ............................. 2001-053782

(51) Int. Cl.
*C08L 67/00*   (2006.01)
*C08L 77/00*   (2006.01)

(52) U.S. Cl. ...................... 525/166; 525/165; 525/177; 525/178; 525/184

(58) Field of Classification Search ................ 525/165, 525/166, 177, 178, 184

See application file for complete search history.

(56) References Cited

U.S. PATENT DOCUMENTS

| | | | | |
|---|---|---|---|---|
| 5,371,143 A | * | 12/1994 | Novak et al. | 525/88 |
| 5,710,212 A | * | 1/1998 | Asano et al. | 525/63 |
| 5,714,573 A | * | 2/1998 | Randall et al. | 528/354 |
| 6,166,143 A | * | 12/2000 | Watanabe et al. | 525/208 |
| 6,469,087 B1 | * | 10/2002 | Singh et al. | 524/425 |

FOREIGN PATENT DOCUMENTS

| | | |
|---|---|---|
| JP | 9-12872 A | 1/1997 |
| JP | 2000-63664 A | 2/2000 |
| JP | 2001-40191 A | 2/2001 |
| JP | 2002-105343 A | 4/2002 |

OTHER PUBLICATIONS

English Translation of JP 2000-063664, Machine translation from JPO web-site, Inaike et al. Feb. 2000.*
English Translation of JP 2001-040191, Machine translation from JPO web-site, Katsumata Feb. 2001.*

* cited by examiner

*Primary Examiner*—Jeffrey B. Robertson
(74) *Attorney, Agent, or Firm*—Birch, Stewart, Kolasch & Birch, LLP (57) ABSTRACT

A thermoplastic resin composition material 1 includes a resin portion (a) 2 made of a thermoplastic resin (A); elastomer portions (b) 3 made of a thermoplastic elastomer (B) having substantially no compatibility with the thermoplastic resin (A) and having a glass transition temperature of lower than or equal to −40° C.; and polymer portions (c) 4 made of a high polymer (C) having substantially no compatibility with the thermoplastic resin (A) and the thermoplastic elastomer (B), having a glass transition temperature or crystallization temperature of lower than or equal to −50° C., and having a viscosity at 40° C. of 0.1 to 200000 cP. The material has a structure in which the elastomer portions (b) 3 are dispersed in the resin portion (a) 2, and the polymer portions (c) 4 are dispersed in the elastomer portions (b) 3.

Accordingly, low-temperature impact resistance can significantly be improved without deterioration in the other inherent excellent physical properties of the thermoplastic resin.

11 Claims, 7 Drawing Sheets

THERMOPLASTIC RESIN COMPOSITION MATERIAL AND FORMED ARTICLE COMPRISING SAID MATERIAL

This application is the national phase under 35 U.S.C. § 371 of PCT International Application No. PCT/JP02/01693 which has an International filing date of Feb. 26, 2002, which designated the United States of America.

TECHNICAL FIELD

The present invention relates to a thermoplastic resin composition material. More specifically, it relates to a material comprising a thermoplastic resin composition that is useful for the production of molded articles which require low-temperature impact resistance and to such molded articles made from the thermoplastic resin composition material.

BACKGROUND ART

To improve low-temperature impact resistance of molded articles made from thermoplastic resins, various elastomers (rubber components) are blended with or plasticizers are added to the thermoplastic resins. Alternatively, both elastomers and plasticizers are added to the thermoplastic resins. When costs are no object, thermoplastic elastomers are used in some cases.

For example, Japanese Examined Patent Application Publication No. 06-45748 discloses a polyamide composition which includes a polyamide, a graft modified ran-copoly (ethylene/α-olefin) and a low molecular weight modified ethylenic random copolymer added to the polyamide in order to improve its low-temperature impact resistance. The graft-modified ran-copoly(ethylene/α-olefin) herein is graft-modified with an α,β-unsaturated carboxylic acid or its acid derivative, and the low molecular weight modified ethylenic random copolymer is a low molecular weight ethylenic copolymer graft-polymerized with an α,β-unsaturated carboxylic acid or its derivative. Japanese Unexamined Patent Application Publications No. 60-156747 and No. 01-272659 disclose resin compositions having improved impact resistance and comprising a polyester and a graft-modified polyolefin.

DISCLOSURE OF INVENTION

However, some of the resulting molded articles undergone these improvements may have insufficient impact resistance at low temperatures. To solve this problem, one skilled in the art uses large amounts of elastomers or adds plasticizers to a resin up to a limitation at which the plasticizers have compatibility with the resin. The use of the elastomers in large amounts, however, may invite deterioration in properties such as strength (e.g., tensile strength and flexural strength), heat resistance, and chemical resistance. The addition of the plasticizers in large amounts may cause bleeding of the plasticizers.

Accordingly, an object of the present invention is to provide a thermoplastic resin composition material that can have significantly improved low-temperature impact resistance without deterioration in the other excellent inherent physical properties of thermoplastic resins, as well as to provide a molded article made from the thermoplastic resin composition material.

After intensive investigations to achieve the above object, the present inventors have found that, by adding and admixing a thermoplastic elastomer and a high polymer to a thermoplastic resin and dispersing these components to a specific dispersion state, impact resistance at low temperatures can substantially be improved without deterioration in properties (e.g., tensile properties, flexural properties, and heat resistant properties) of the thermoplastic resin as compared with the case where the components are not in the specific dispersion state. The present invention has been accomplished based on these findings.

Specifically, the present invention provides a thermoplastic resin composition material including a resin portion (a) made of a thermoplastic resin (A); elastomer portions (b) made of a thermoplastic elastomer (B) having substantially no compatibility with the thermoplastic resin (A) and having a glass transition temperature of lower than or equal to −40° C.; and polymer portions (c) made of a high polymer (C) having substantially no compatibility with the thermoplastic resin (A) and the thermoplastic elastomer (B), having a glass transition temperature or crystallization temperature of lower than or equal to −50° C., and having a viscosity at 40° C. of from 0.1 to 200000 cP, wherein the material has a structure in which the elastomer portions (b) are dispersed in the resin portion (a), and the polymer portions (c) are dispersed in the elastomer portions (b).

In the present invention, 0.5 to 100 parts by weight of the thermoplastic elastomer (B) and 0.01 to 10 parts by weight of the high polymer (C) are preferably contained relative to 100 parts by weight of the thermoplastic resin (A). It is also preferred that the percentage of elastomer portions (b) encapsulating the polymer portions (c) dispersed therein is equal to or more than 30% by volume based on the total amount of the elastomer portions (b), and that the percentage of the polymer portions (c) dispersed in the elastomer portions (b) is equal to or more than 50% by volume based on the total amount of the polymer portions (c).

As the thermoplastic resin (A), a polyamide or a polyester can be used. As the thermoplastic elastomer (B), an olefinic elastomer or a styrenic elastomer can be used. In addition, a polyether can be used as the high polymer (C).

The present invention also includes a molded article made from the thermoplastic resin composition material.

The glass transition temperature (glass transition point) or crystallization temperature (melting point) in the present invention can be determined according to a procedure described in Japanese Industrial Standards (JIS) K 7121.

BEST MODE FOR CARRYING OUT THE INVENTION

Figure 1:
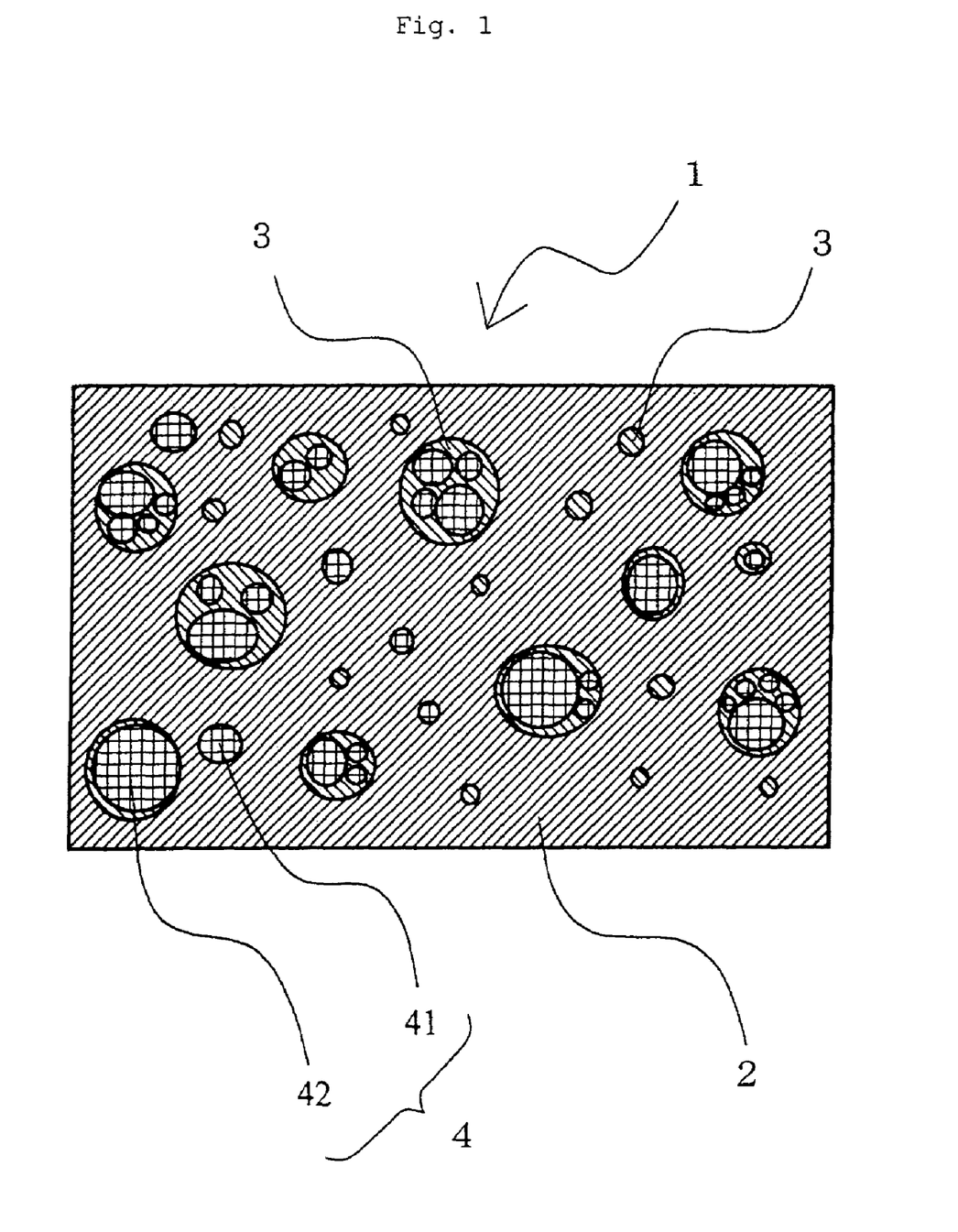
FIG. 1 is a schematic sectional view showing a structure of a thermoplastic resin composition material of the present invention.

The present invention will be illustrated in further detail with reference to the attached drawings according to necessity. FIG. 1 is a schematic sectional view showing a structure of a thermoplastic resin composition material of the present invention. FIG. 1 illustrates a thermoplastic resin composition material 1, a resin portion (a) 2 comprising a thermoplastic resin (A), elastomer portions (b) 3 comprising a thermoplastic elastomer (B), and polymer portions (c) 4 comprising a high polymer (C). Polymer portions (c) 41 are dispersed in the resin portion (a) 2, and polymer portions (c) 42 are dispersed in the elastomer portions (b) 3.

The thermoplastic resin (A), the thermoplastic elastomer (B), and the high polymer (C) used in the thermoplastic resin composition material 1 are three components having substantially no compatibility or miscibility with one another. Specifically, the thermoplastic elastomer (B) is not substantially compatible with the thermoplastic resin (A), and the high polymer (C) is not substantially compatible with the thermoplastic resin (A) and the thermoplastic elastomer (B). Accordingly, in the thermoplastic resin composition material 1, the elastomer portions (b) 3 comprising the thermoplastic elastomer (B) are dispersed in the resin portion (a) 2 comprising the thermoplastic resin (A), and the polymer portions (c) 42 comprising the high polymer (C) are dispersed in the elastomer portions (b) 3 comprising the thermoplastic elastomer (B).

This structure means a polyphase structure formed in a resin composition comprising three types of components (or materials) that are not compatible with one another. It has been already known that such resin compositions comprising three types of polymers having incompatibility with one another can have various polyphase structures. For example, "Polyphase Structure Formation in Ternary System Polymer Blend and Neumann Triangle", Kobunshi Ronbunshu (Japanese Journal of Polymer Science and Technology), 47 (5), 409 (published by The Society of Polymer Science, Japan; date of issue: May 25, 1990) describes in detail that "polyphase structures of polymer blends each containing a phase 1 and a phase 2 as dispersed phases and a phase 3 as a matrix phase can be grouped under the following four types: (i) capsule composite particles comprising the phase 1 surrounding the phase 2, (ii) composite particles comprising the phase 2 surrounding the phase 1, (iii) adhered composite particles comprising the phase 1 and the phase 2 adhered to each other, and (iv) separate particles where the phase 1 and the phase 2 are dispersed separately." The structure of the thermoplastic resin composition material according to the present invention is the "capsule composite particle" structure, in which the thermoplastic elastomer (B) is dispersed in the thermoplastic resin (A) as a matrix phase, which thermoplastic elastomer (B) constitutes particles encapsulating the high polymer (C). In other words, the thermoplastic resin composition material 1 has a polyphase structure in which a phase made of the thermoplastic resin (A) is contained as the matrix phase (the phase 3), and a dispersed phase (the phase 1) made of the thermoplastic elastomer (B) surrounds or encapsulates a dispersed phase (the phase 2) made of the high polymer (C).

The aforementioned journal mentions that the structure in question is determined by a balance in surface tension (interfacial tension) and polarity among the constitutive three polymers. In addition, the structure can be predicted by determining the surface tension and polarity of the polymers or according to typically a procedure as in a convenient experimental method described in the journal. According to the present invention, therefore, the target structure can be formed by determining the surface tensions and polarities of the polymers or performing the procedure in the convenient experimental method described in the journal to thereby select an appropriate combination of the thermoplastic resin (A), the thermoplastic elastomer (B), and the high polymer (C) depending on typically the interfacial tensions of the individual components.

In the thermoplastic resin composition material 1, the resin portion (a) 2 has a function as a matrix, the elastomer portions (b) 3 and the polymer portions (c) 4 are dispersed in the resin portion (a) 2, and part or all of the polymer portions (c) 4 are dispersed in the elastomer portions (b) 3. In other words, the thermoplastic resin composition material 1 of the present invention has a structure in which the elastomer portions (b) 3 are dispersed in the resin portion (a) 2, and the polymer portions (c) 42 are dispersed in the elastomer portions (b) 3. The thermoplastic resin composition material 1 can thereby have markedly improved low-temperature impact resistance without deterioration in the other excellent physical properties derived from the thermoplastic resin (A).

More specifically, in the thermoplastic resin composition material 1 shown in FIG. 1, the elastomer portions (b) 3 are dispersed in the resin portion (a) 2. The polymer portions (c) 4 mainly comprises the polymer portions (c) 42 dispersed in the elastomer portions (b) 3 and partly comprises the polymer portions (c) 41 directly dispersed in the resin portion (a) 2.

According to the present invention, the percentage of the elastomer portions (b) 3 encapsulating the polymer portions (c) 42 dispersed therein is preferably equal to or more than 30% by volume, and more preferably equal to or more than 50% by volume based on the total amount of the elastomer portions (b) 3. If the percentage of the elastomer portions (b) 3 encapsulating the polymer portions (c) 42 dispersed therein is excessively low, the percentage of the elastomer portions (b) 3 dispersed alone (encapsulating no polymer portions (c) 42) in the resin portion (a) 2 becomes excessively high, and the advantages of the thermoplastic resin composition material of the present invention may deteriorate.

In the present invention, the percentage of the elastomer portions (b) 3 encapsulating the polymer portions (c) 42 dispersed therein may be equal to or more than 30% by weight, and preferably equal to or more than 50% by weight based on the total amount of the elastomer portions (b) 3.

The phrase "the percentage of the elastomer portions (b) 3 encapsulating the polymer portions (c) 42 dispersed therein based on the total amount of the elastomer portions (b) 3" used herein means the percentage of the total volume or total weight of the elastomer (B) in the elastomer portions (b) 3 encapsulating the polymer portions (c) 42 dispersed therein based on the total volume or total weight of the elastomer (B) in the total elastomer portions (b) 3. Accordingly, the percentage does not include the volume or weight of the polymer (C) 42 in the elastomer portions (b) 3 encapsulating the polymer portions (c) 42 dispersed therein.

In the present invention, the percentage of the polymer portions (c) 42 dispersed in the elastomer portions (b) 3 is preferably equal to or more than 50% by volume, and more preferably equal to or more than 70% by volume based on the total amount of the polymer portions (c) 4. If the percentage of the polymer portions (c) 42 dispersed in the elastomer portions (b) 3 is excessively low, the percentage of the polymer portions (c) 41 directly dispersed in the resin portion (a) 2 becomes excessively high, and the advantages of the thermoplastic resin composition material of the present invention may deteriorate.

In the present invention, the percentage of the polymer portions (c) 42 dispersed in the elastomer portions (b) 3 may be equal to or more than 50% by weight and preferably equal to or more than 70% by weight based on the total amount of the polymer portions (c) 4.

In the thermoplastic resin composition material 1, the shape of dispersed particles in the dispersed phase made of the elastomer portions (b) 3 and dispersed in the resin portion (a) 2 and the shape of dispersed particles of the dispersed phase made of the polymer portions (c) 4 and dispersed in the thermoplastic resin (A) or in the thermoplastic elastomer (B) are not specifically limited. For example, these dispersed particles may be approximately circular (e.g., approximately perfectly circular or approximately elliptic) in cross section.

[Thermoplastic Resins (A)]

The thermoplastic resins (A) are not specifically limited and include wide variety of thermoplastic resins, as long as they can be used as molding materials and are suitable for the formation of the aforementioned structure. Typical examples of such thermoplastic resins (A) are polyamides, polyesters, polycarbonates, polyacetals, poly(phenylene ether)s, poly(phenylene sulfide) s, poly(etheretherketone)s, poly(aryl ether ketone)s, poly(amide-imide)s, poly(ether imide)s, polysulfones, poly(ether sulfone) s, olefinic resins, styrenic resins, methacrylic resins, and polymer alloys containing these resins. Among them, polyamides and polyesters are preferred as the thermoplastic resins (A). Each of these thermoplastic resins (A) can be used alone or in combination.

The thermoplastic resins (A) for use in the present invention may be modified within ranges not deteriorating the objects of the present invention. Such modification includes, for example, modification by copolymerization or graft-modification, and modification by imparting polar groups within ranges not deteriorating the properties of the resins.

The polyamides include, but are not limited to, polyamides obtained by polycondensation between diamines and dicarboxylic acids, which diamines include, for example, aliphatic, alicyclic, or aromatic diamines such as hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexyl)methane, and m- or p-xylylenediamine, and which dicarboxylic acids include, for example, aliphatic, alicyclic, or aromatic dicarboxylic acids such as adipic acid, suberic acid, sebacic acid, cyclohexanedicarboxylic acid, terephthalic acid, and isophthalic acid; polyamides obtained by condensation of aminocarboxylic acids such as ε-aminocarboxylic acid, and 11-aminoundecanoic acid; polyamides obtained from lactams such as ε-caprolactam, and ω-laurolactam; copolyamides obtained from the aforementioned components (e.g., diamines, dicarboxylic acids, aminocarboxylic acids, and lactams); and mixtures of these polyamides.

More specifically, the polyamides (nylons) include, but are not limited to, polyamide 6, polyamide 66, polyamide 46, polyamide 11, polyamide 12, polyamide 610, polyamide 612, polyamide 1010, aromatic polyamides, and alicyclic polyamides. The polyamides also include multiblock copolymers comprising hard segments and soft segments, which hard segments are made of polyamides such as polyamide 6, polyamide 66, polyamide 11, and polyamide 12, and which soft segments are made of polyether components.

The polyesters include, but are not limited to, polyesters obtained by polycondensation between dihydroxy compounds and dicarboxylic acids; copolyesters comprising these components; and mixtures of these polyesters. The dihydroxy compounds include, for example, ethylene glycol, propylene glycol, 1,3-propane diol, 1,4-butanediol, neopentyl glycol, cyclohexanediol, cyclohexanedimethanol, 1,4-bis(2-hydroxyethoxy)benzene, 1,3-bis(2-hydroxyethoxy)benzene, 2,2-bis[4-(2-hydroxyethoxy)phenyl]propane, bis[4-(2-hydroxyethoxy)phenyl]sulfone, bis(4-hydroxyphenyl)methane, 2,2-bis(4-hydroxyphenyl)propane, and other typically aliphatic, alicyclic, or aromatic dihydroxy compounds. The dicarboxylic acids include, for example, terephthalic acid, isophthalic acid, diphenylether-4,4-dicarboxylic acid, naphthalene-1,4-dicarboxylic acid, naphthalene-2,6-dicarboxylic acid, oxalic acid, succinic acid, adipic acid, sebacic acid, undecanedicarboxylic acids, hexahydroterephthalic acid, and other typically aliphatic, alicyclic, or aromatic dicarboxylic acids.

The polycarbonates include, for example, polycarbonates obtained as a result of a reaction between a dihydroxy compound such as bisphenol A and phosgene or a carbonic diester such as diphenyl carbonate. The polyacetals include, for example, homopolymers obtained by polymerization of formaldehyde, and copolymers obtained by cyclic polymerization of trioxane and a cyclic ether. The poly(phenylene ether)s include, for example, polymers mainly containing poly(2,6-dimethylphenylene oxide), and modified poly(phenylene ether)s. The olefinic resins include, for example, polyethylenes, polypropylenes and other polyolefins, and olefinic copolymers. The styrenic resins include, for example, polystyrenes; and ABS resins, AXS resins, and other styrenic copolymers.

[Thermoplastic Elastomers (B)]

Thermoplastic elastomers having a glass transition temperature (glass transition point) of lower than or equal to −40° C. and not being compatible with the thermoplastic resins (A) are used as the thermoplastic elastomers (B). Such thermoplastic elastomers (B) are materials having thermal plasticity as substances having rubber-like elasticity and are not specifically limited as long as they are not substantially compatible or miscible with the thermoplastic resins (A), have a glass transition temperature of lower than or equal to −40° C. and preferably lower than or equal to −50° C. and are suitable for the formation of the specific structure. More specifically, the thermoplastic elastomers (B) include, but are not limited to, olefinic elastomers, styrenic elastomers, ester elastomers, urethane elastomers, amide elastomers, vinyl chloride elastomers, as well as blends (mixtures) of these elastomers. Each of these thermoplastic elastomers (B) can be used alone or in combination.

The thermoplastic elastomers (B) for use in the present invention may be modified within ranges not deteriorating the objects of the present invention. For example, the thermoplastic elastomers (B) may be modified products of the above-exemplified thermoplastic elastomers. Modification in the thermoplastic elastomers (B) includes, for example, modification by copolymerization or graft modification, and modification by imparting polar groups. The polar groups may be imparted by graft modification. Such polar groups include, but are not limited to, epoxy groups, carboxyl groups, acid anhydride groups, hydroxyl groups, amino groups, and oxo groups. Each of these polar groups can be imparted alone or in combination. Such modified products of the thermoplastic elastomers (B) carrying polar groups include, for example, epoxy-modified thermoplastic elastomers (epoxidized thermoplastic elastomers), carboxy-modified thermoplastic elastomers, acid anhydride-modified thermoplastic elastomers, hydroxy-modified thermoplastic elastomers, and amino-modified thermoplastic elastomers.

Olefinic elastomers and styrenic elastomers can advantageously be used as the thermoplastic elastomers (B).

Such olefinic elastomers are not specifically limited and typically include block copolymers comprising polyolefins as hard segments and rubber components as soft segments. Polyolefins constituting the hard segments include, for example, homo- or copolymers of ethylene, propylene, 1-butene, 1-pentene, 4-methyl-1-pentene, 3-methyl-1-pentene, 1-octene, 1-decene, 1-dodecene, 1-tetradecene, 1-hexadecene, 1-octadecene, and other α-olefins each containing from about 2 to about 20 carbon atoms. Each of these polyolefins can be used alone or in combination. Preferred olefins include ethylene and propylene.

The rubber components constituting the soft segments include, but are not limited to, ethylene-propylene rubber (EPR), ethylene-propylene-diene rubber (EPDM), polybutadienes, polyisoprenes, natural rubber (NR), nitrile rubber (NBR; acrylonitrile-butadiene rubber), styrene-butadiene rubber (SBR), chloroprene rubber (CR), butyl rubber (isobutylene-isoprene rubber; IIR), hydrogenated NBR (H-NBR), acrylonitrile-isoprene rubber (NIR), and acrylonitrile-isoprene-butadiene rubber (NBIR). The rubber components also include acid-modified rubber such as carboxylated rubber comprising an unsaturated carboxylic acid (e.g., (meth)acrylic acid, maleic acid, and maleic anhydride) as a comonomer, as well as other modified rubber, and hydrogenated products. Each of these rubber components can be used alone or in combination.

The olefinic elastomers for use in the present invention are preferably olefinic elastomers comprising ethylene or propylene at least as a constitutional repeating unit of the polyolefin in the hard segment, and modified products thereof (e.g., epoxidized olefinic elastomers).

The styrenic elastomers include block copolymers comprising polystyrene as a hard segments and a rubber component as a soft segment. In the present invention, polystyrenes comprising styrene at least as a constitutional repeating unit of the polystyrene constituting the hard segment and modified products thereof (e.g., epoxidized styrenic elastomers) are preferred. Such rubber components constituting the soft segment include the aforementioned rubber components (e.g., polybutadienes, polyisoprenes, and hydrogenated products of these polymers).

The ester elastomers include, for example, block copolymers each comprising a polyester such as poly(butylene terephthalate) as a hard segment and a long-chain polyol or polyester as a soft segment. The urethane elastomers include, for example, block copolymers each comprising a polyurethane made from a short-chain glycol as a hard segment and a long-chain polyol or polyester as a soft segment. The amide elastomers include, for example, block copolymers each comprising a polyamide as a hard segment and a long-chain polyol or polyester as a soft segment.

The vinyl chloride elastomers include, for example, block copolymers each comprising poly(vinyl chloride) as a hard segment and any of the rubber components (e.g., nitrile rubber) as a soft segment, as well as mixtures comprising a vinyl chloride resin and a plasticizer.

The proportion of the thermoplastic elastomer (B) in the thermoplastic resin composition of the present invention can appropriately be selected within a range not deteriorating the properties of the thermoplastic resin (A) and is generally from about 0.5 to about 100 parts by weight, preferably from about 2 to about 60 parts by weight, more preferably from about 5 to about 40 parts by weight, and particularly from about 10 to about 30 parts by weight, relative to 100 parts by weight of the thermoplastic resin (A). If the proportion of the thermoplastic elastomer (B) is excessively high, strength, heat resistance, and other inherent properties of the thermoplastic resin (A) may deteriorate. In contrast, if it is excessively low, the impact resistance at low temperatures may not be improved successfully.

[High Polymers (C)]

High polymers having a glass transition temperature or crystallization temperature (melting point) of lower than or equal to −50° C. and a viscosity at 40° C. of from 0.1 to 200000 cP are used as the high polymers (C). It is of importance that the high polymers (C) are substantially incompatible with the thermoplastic resins (A) and the thermoplastic elastomers (B) Such high polymers (C) are not specifically limited as long as they are substantially incompatible with the thermoplastic resins (A) and the thermoplastic elastomers (B), have a glass transition temperature or crystallization temperature (melting point) of lower than or equal to −50° C., preferably lower than or equal to −70° C., have a viscosity at 40° C. of from 0.1 to 200000 cP, preferably from 10 to 100000 cP, and more preferably from 50 to 10000 cP, and are suitable for the formation of the specific structure. As the high polymers (C), use can preferably be made of high polymers in the form of oils, waxes, and grease, for example.

The term "high polymers" as used herein means and includes polymers each comprising single or plural monomers and having a degree of polymerization of equal to or more than 3.

More specifically, the high polymers (C) include, for example, polyethers, oils such as silicone oils, and unvulcanized rubber materials such as unvulcanized polybutadienes. Among them, polyethers can advantageously be used as the high polymers (C). Such polyethers include, but are not limited to, polyethylene glycols, polypropylene glycols, polytetramethylene glycols, polyoxyethylene polyoxypropylene block copolymers, polypropylene tetramethylene glycols (PPTGs) (polyoxypropylene polyoxytetramethylene block copolymers), and other polyalkylene glycols (inclusive of copolymers), and derivatives thereof such as monoalkyl ethers, dialkyl ethers, monoacyl derivatives, diacyl derivatives, and monoalkyl ether monoacyl derivatives.

Each of these polyethers can be used alone or in combination. Preferred polyethers include polyethylene glycols, polypropylene glycols, polypropylene tetramethylene glycols (PPTGs), and other polyalkylene glycols (inclusive of copolymers). The number average molecular weights of the polyalkylene glycols can be selected within a range of, for example, from about 30 to about 1000000, preferably from about 60 to about 100000, and more preferably from about 120 to about 50000.

The proportion or content of the high polymers (C) in the thermoplastic resin composition of the present invention can appropriately be selected within a range not deteriorating the properties of the thermoplastic resins (A) and is generally from about 0.01 to about 10 parts by weight, preferably from about 0.1 to about 8 parts by weight, and more preferably from about 0.5 to about 6 parts by weight, relative to 100 parts by weight of the thermoplastic resins (A). If the amount of the high polymers (C) is excessively large, these may bleed out from the resin and may deteriorate strength, heat resistance, and other inherent properties of the thermoplastic resins (A) even if all of the high polymers (c) are encapsulated by the thermoplastic elastomer (B). In contrast, if it is excessively small, the impact resistance at low temperatures may not be improved successfully.

The viscosity can be determined according to a known procedure using, for example, a single-cylinder rotational viscometer or a dual-cylinder rotational viscometer. When the high polymer (C) is crystalline, the crystalline high polymer (C) may be heated to a temperature equal to or higher than its melting point before determination of the viscosity.

The high polymers (C) for use in the present invention may be modified within ranges not deteriorating the objects of the present invention. Such modification includes, for example, modification by copolymerization or graft modification, and modification by imparting polar groups within ranges not deteriorating the properties of the high polymers.

The term "compatibility" as used herein means a state in which two substances are mixed on the molecular level. Whether or not two substances are compatible with each other can be determined according to a known procedure such as a process in which changes in glass transition points of the two substances as a mixture are determined.

The thermoplastic resin composition may further comprise other additives within ranges not deteriorating the low-temperature impact resistance. Such additives include, for example, inorganic fillers (e.g., carbon black), antioxidants, plasticizers, coloring agents, coupling agents, heat stabilizers, weathering stabilizers, mold release agents, lubricants, antistatic agents, flame retarders, and foaming agents. The thermoplastic resin composition may further comprise thermoplastic elastomers that can be dispersed alone in the resin portion (a) in addition to the thermoplastic elastomers (B).

The thermoplastic resin composition material of the present invention can be prepared by mixing the thermoplastic resin (A), the thermoplastic elastomer (B), and the high polymer (C), as well as other resins and additives according to necessity, in their melting states. Alternatively, the thermoplastic resin composition material can be prepared by dissolving or dispersing the raw materials in a solvent, mixing the resulting mixture, and removing the solvent. These components can be mixed using conventional mixers or blenders, extruders, kneaders and other kneading machines.

Molded articles in desired shapes can be prepared according to a regular melt molding process such as compression molding, injection molding, and extrusion molding using the thermoplastic resin composition prepared in the above manner. Typical examples of such molded articles include shuttle cocks and other sporting goods, shoes, tubes, hoses, gears, and other automobile or machine parts, and electric appliance parts.

The present invention will be illustrated in further detail with reference to several examples below, which are not intended to limit the scope of the invention.

EXAMPLE 1

A total of 100 parts by weight of a polyamide 12 (available from Daicel-Huels Ltd., under the trade name of "DAIAMID") as the thermoplastic resin (A), 6 parts by weight of an olefinic elastomer (available from Mitsui Chemicals, Inc. under the trade name of "Toughmer MH 5010"; glass transition temperature: −51° C.) as the thermoplastic elastomer (B), and 3 parts by weight of a polyether glycol (available from Hodogaya Chemical Co., Ltd. under the trade name of "PPTG-1000"; glass transition temperature: −75° C., viscosity at 40° C.: 150 cP) as the high polymer (C) were mixed and were pelletized using a dual screw extruder. The resulting pellets were subjected to injection molding through an injection molding machine at a temperature of 250° C. and thereby yielded a test piece [an IZOD impact test piece (notched) in accordance with ASTM D 256].

EXAMPLE 2

A total of 100 parts by weight of a polyamide 6 (available from UNITIKA Ltd. under the trade name of "A8030A") as the thermoplastic resin (A), 6 parts by weight of an olefinic elastomer (available from Mitsui Chemicals, Inc. under the trade name of "Toughmer MH 5010"; glass transition temperature: −51° C.) as the thermoplastic elastomer (B), and 3 parts by weight of a polyether glycol (available from Hodogaya Chemical Co., Ltd. under the trade name of "PPTG-1000"; glass transition temperature: −75° C., viscosity at 40° C.: 150 cP) as the high polymer (C) were mixed and were pelletized using a dual screw extruder. The resulting pellets were subjected to injection molding through an injection molding machine at a temperature of 250° C. and thereby yielded a test piece [an IZOD impact test piece (notched) in accordance with ASTM D 256].

EXAMPLE 3

A total of 100 parts by weight of a poly(butylene terephthalate) (available from Polyplastics Co., Ltd. under the trade name of "Duranex 400 FP") as the thermoplastic resin (A), 10 parts by weight of an epoxidized styrenic elastomer (an epoxidized styrene-butadiene-styrene block copolymer elastomer available from Daicel Chemical Industries, Ltd. under the trade name of "EPOFRIEND A1020"; glass transition temperature: −64° C.) as the thermoplastic elastomer (B), and 5 parts by weight of a polyether glycol (available from Hodogaya Chemical Co., Ltd. under the trade name of "PPTG-1000"; glass transition temperature: −75° C., viscosity at 40° C.: 150 cP) as the high polymer (C) were mixed and were pelletized using a dual screw extruder. The resulting pellets were subjected to injection molding through an injection molding machine at a temperature of 250° C. and thereby yielded a test piece [an IZOD impact test piece (notched) in accordance with ASTM D 256].

COMPARATIVE EXAMPLE 1

A test piece [an IZOD impact test piece (notched) in accordance with ASTM D 256] was prepared in the same manner as in Example 1, except that a styrenic elastomer (available from Asahi Kasei Corporation under the trade name of "Tufprene 126"; glass transition temperature: −85° C.) was used instead of the olefinic elastomer (trade name: "Toughmer MH 5010").

COMPARATIVE EXAMPLE 2

A test piece [an IZOD impact test piece (notched) in accordance with ASTM D 256] was prepared in the same manner as in Example 2, except that a silicone oil (available from Shin-Etsu Chemical Co., Ltd. under the trade name of "Silicone Oil KF96-3000"; crystallization temperature: −75° C., viscosity at 40° C.: 2100 cP) was used instead of the polyether glycol (trade name: "PPTG-1000")

COMPARATIVE EXAMPLE 3

A test piece [an IZOD impact test piece (notched) in accordance with ASTM D 256] was prepared in the same manner as in Example 3, except that a silicone oil (available from Shin-Etsu Chemical Co., Ltd. under the trade name of "Silicone Oil KF96-3000"; crystallization temperature: −75° C., viscosity at 40° C.: 2100 cP) was used instead of the polyether glycol (trade name: "PPTG-1000")

Evaluation

Figure 2:
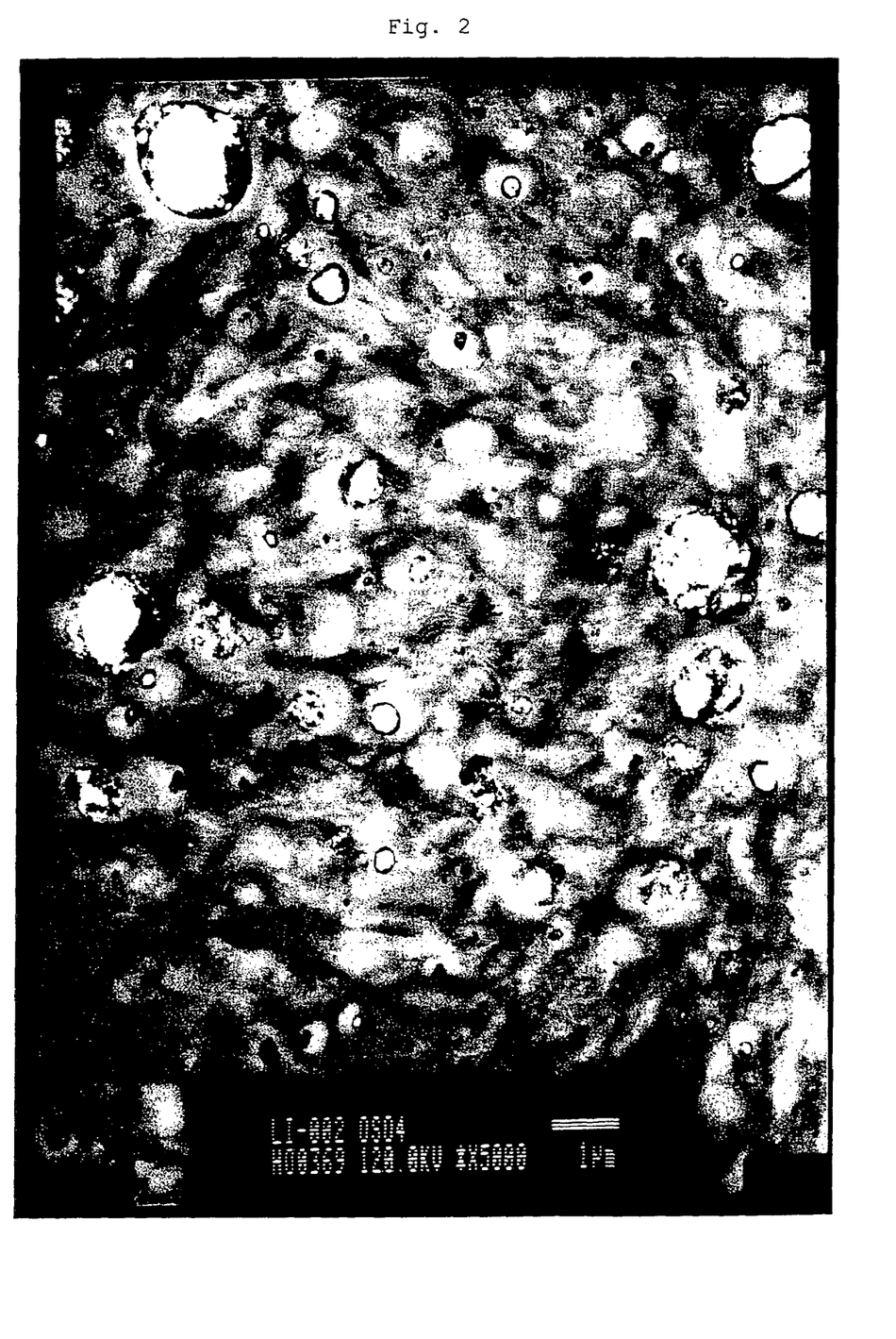
FIG. 2 diagrammatically shows a transmission electron micrograph of a test piece according to Example 1.
Figure 3:
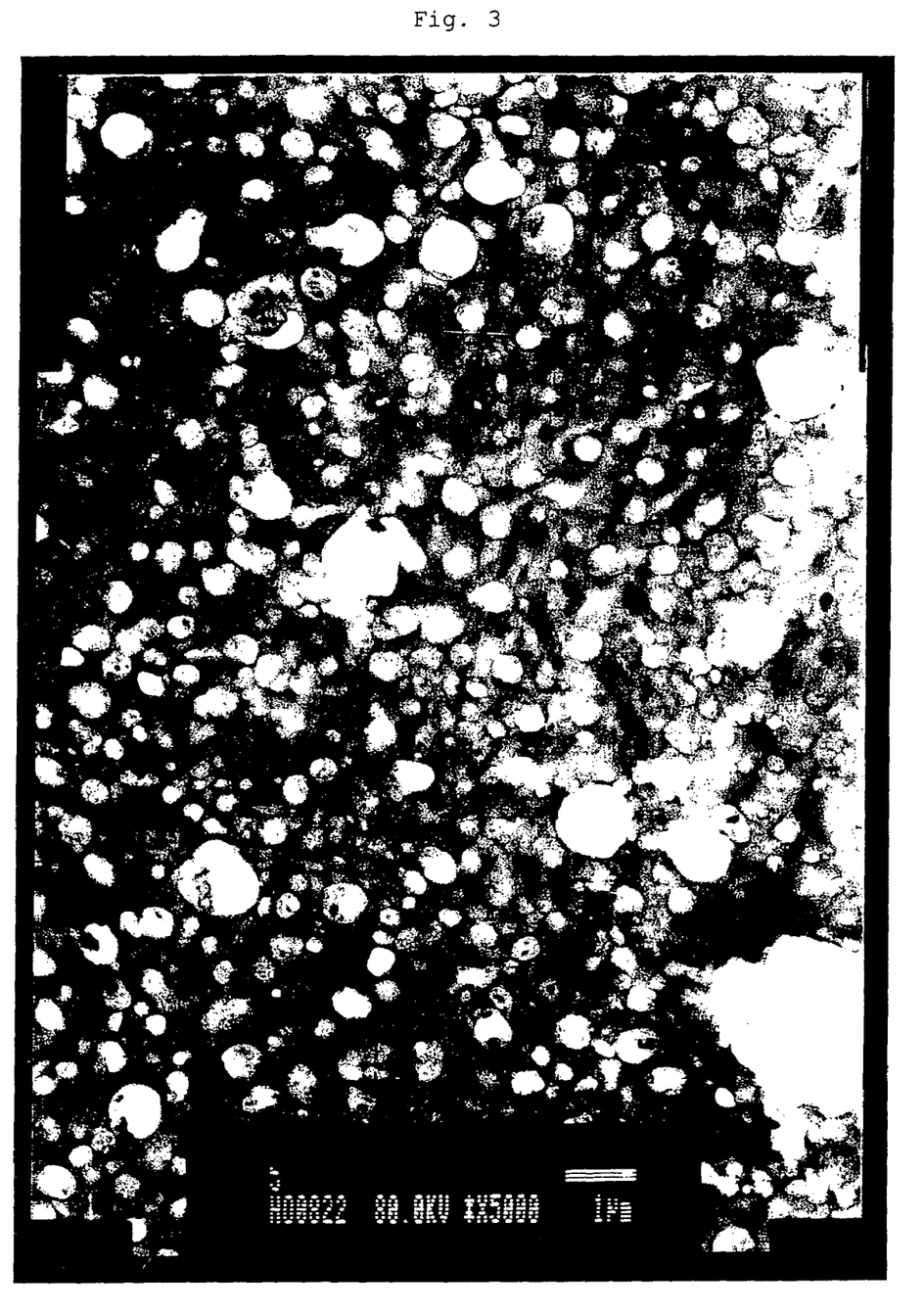
FIG. 3 diagrammatically shows a transmission electron micrograph of a test piece according to Example 2.
Figure 4:
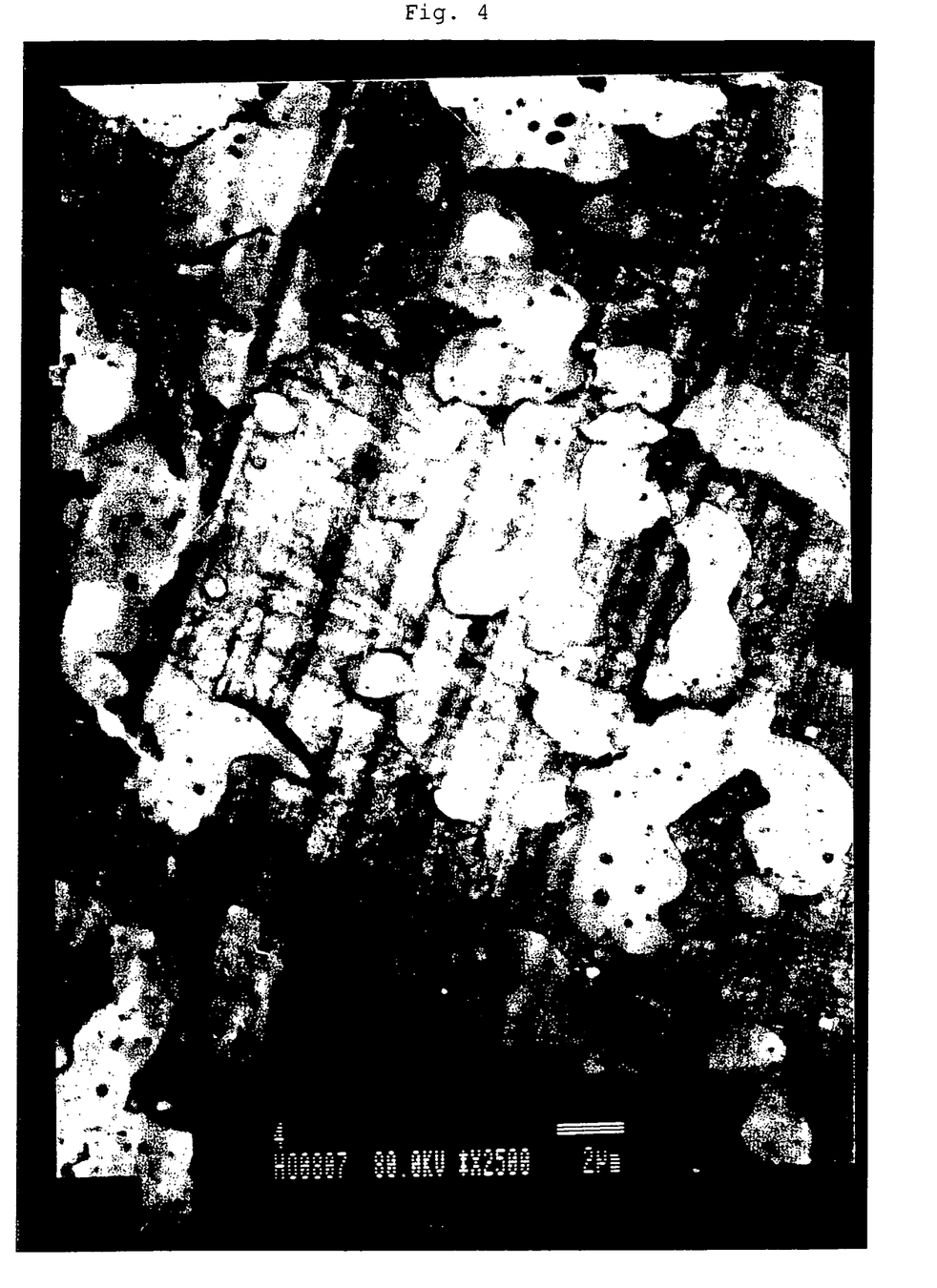
FIG. 4 diagrammatically shows a transmission electron micrograph of a test piece according to Example 3.
Figure 5:
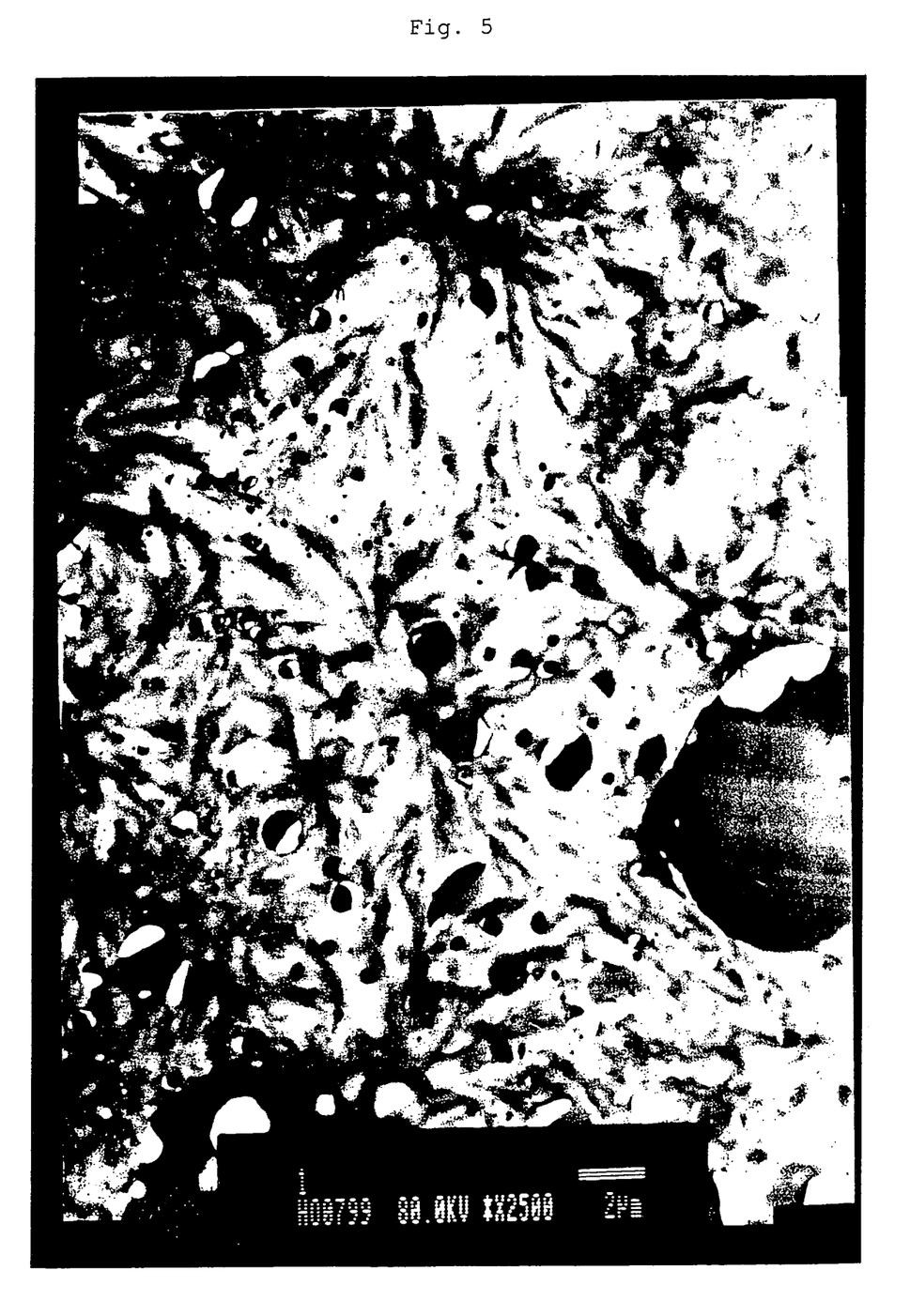
FIG. 5 diagrammatically shows a transmission electron micrograph of a test piece according to Comparative Example 1.
Figure 6:
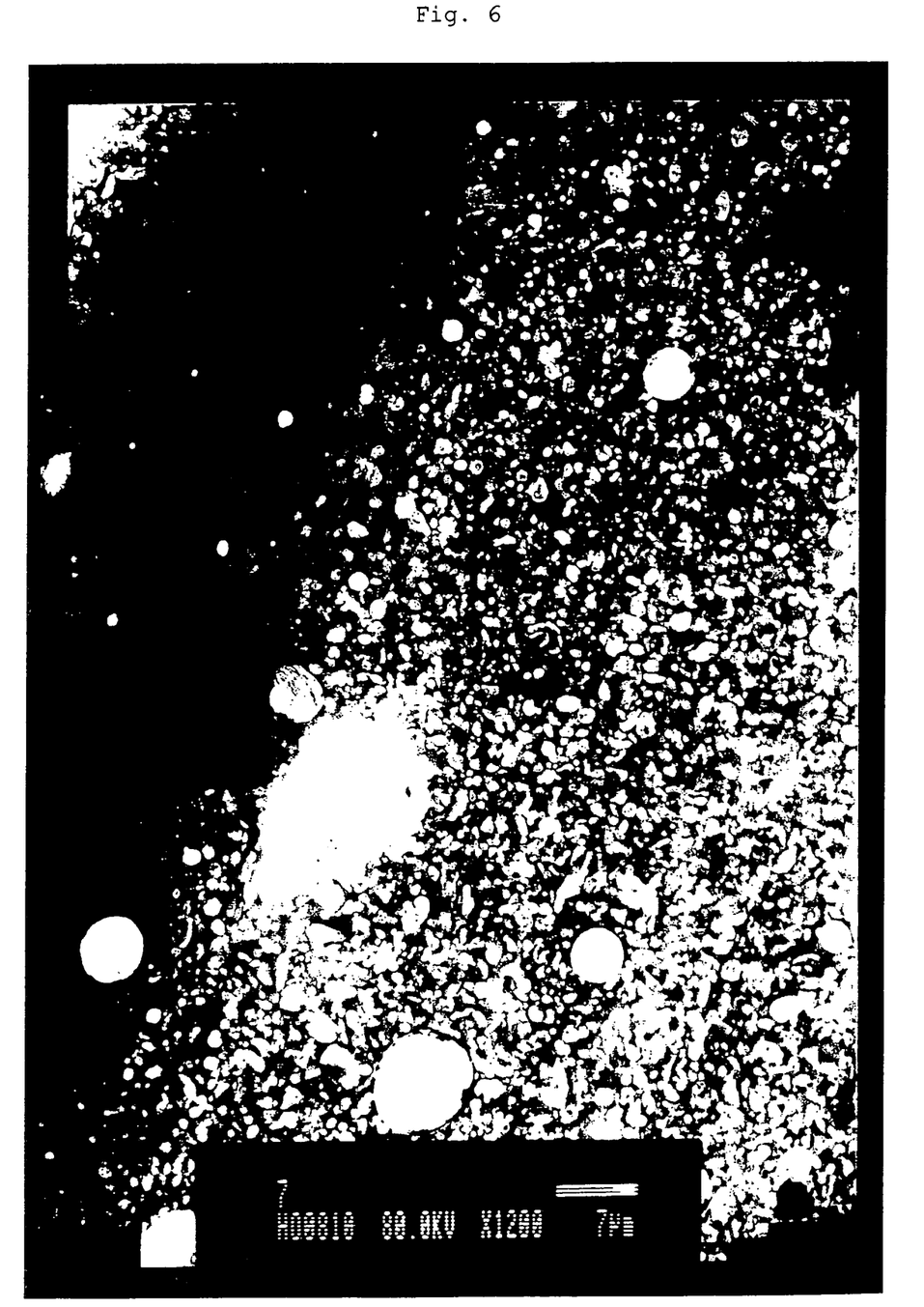
FIG. 6 diagrammatically shows a transmission electron micrograph of a test piece according to Comparative Example 2.
Figure 7:
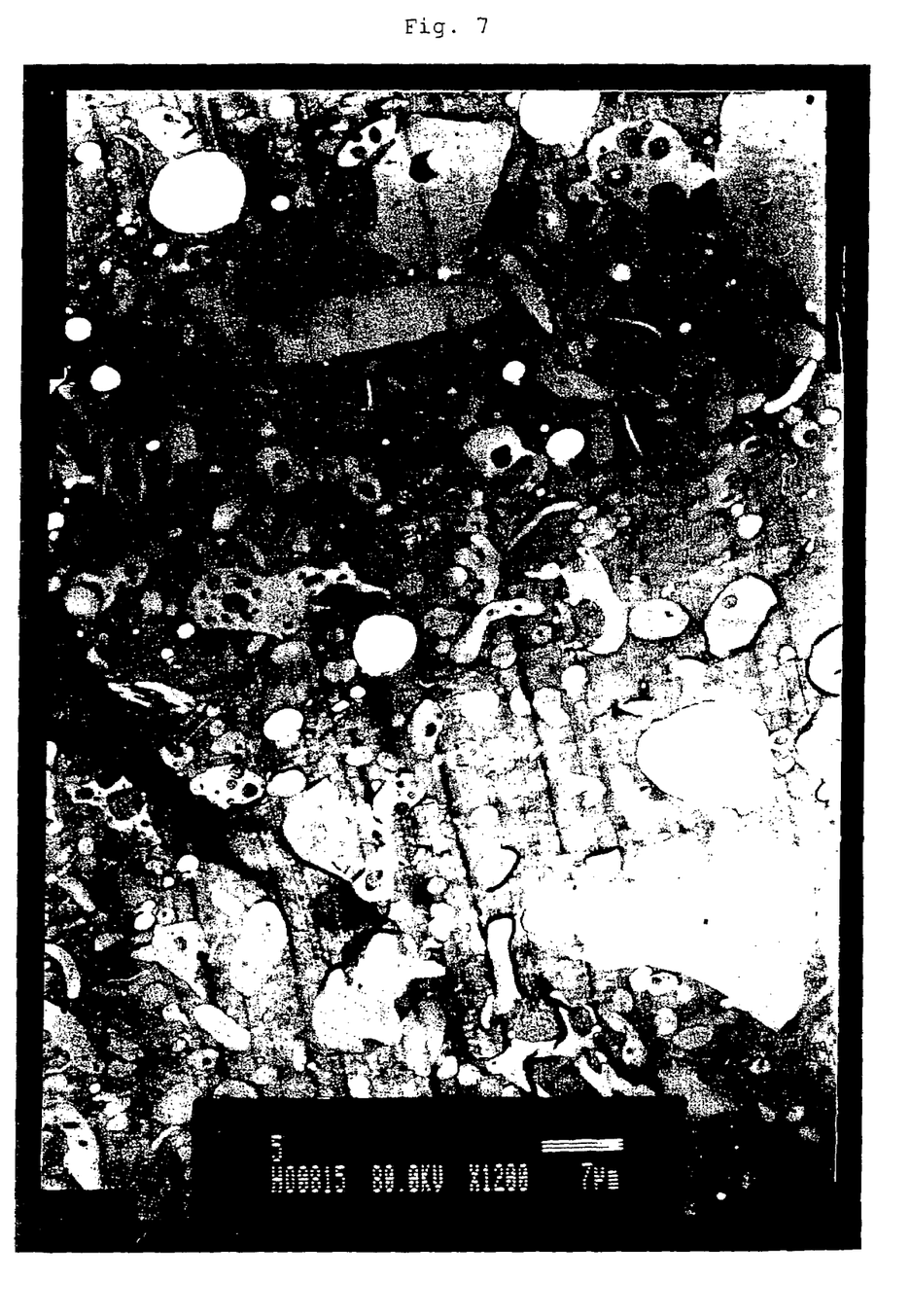
FIG. 7 diagrammatically shows a transmission electron micrograph of a test piece according to Comparative Example 3.

Ultrathin sections were prepared from the test pieces (pellets) obtained according to the examples and comparative examples using a microtome and were subjected to transmitting electron microscopic observation on their structures at room temperature (20° C. to 25° C.) to thereby yielded photographs as shown in FIGS. 2 to 7. FIG. 2 diagrammatically shows a transmission electron micrograph of a test piece according to Example 1; FIG. 3 diagrammatically shows a transmission electron micrograph of a test piece according to Example 2; FIG. 4 diagrammatically shows a transmission electron micrograph of a test piece according to Example 3; FIG. 5 diagrammatically shows a transmission electron micrograph of a test piece according to Comparative Example 1; FIG. 6 diagrammatically shows a transmission electron micrograph of a test piece according to Comparative Example 2; and FIG. 7 diagrammatically shows a transmission electron micrograph of a test piece according to Comparative Example 3.

The structures of the test pieces observed by the photographs are shown in "Structure" in Table 1, in which "Capsule" means a structure in which the thermoplastic elastomer (B) surrounds or encapsulates the high polymer (C); "Contact" means a structure in which the thermoplastic elastomer (B) and the high polymer (C) are in contact with each other and are dispersed in the thermoplastic resin (A); and "Separate" means a structure in which the thermoplastic elastomer (B) and the high polymer (C) are independently dispersed in the thermoplastic resin (A).

FIGS. 2 to 4 show that the thermoplastic elastomer (B) is dispersed in a matrix comprising the thermoplastic resin (A), and that the high polymer (C) is dispersed in the thermoplastic elastomer (B). Specifically, the structures of the test pieces according to Examples 1 to 3 are "Capsule" structures as shown in Table 1.

In contrast, FIG. 5 shows that the thermoplastic elastomer (B) and the high polymer (C) are dispersed in a matrix comprising the thermoplastic resin (A), and that they are in contact with each other and are dispersed in the matrix thermoplastic resin (A) Specifically, the structure of the test piece according to Comparative Example 1 is a "Contact" structure as shown in Table 1.

FIGS. 6 and 7 show that the thermoplastic elastomer (B) and the high polymer (C) are dispersed in a matrix comprising the thermoplastic resin (A), and that they are independently and separately dispersed in the thermoplastic resin (A). Accordingly, the structures of the test pieces according to Comparative Examples 2 and 3 are "Separate" structures as shown in Table 1.

The photographs shown in FIGS. 2 to 7 were subjected to image processing to determine a volume fraction (%) of portions comprising the thermoplastic elastomer (B) and existing alone and independently in the matrix thermoplastic resin (A) based on the total portions comprising the thermoplastic elastomer (B). The resulting volume fractions (%) are shown in "Independent elastomer (B) volume fraction (%)" in Table 1. In addition, a volume fraction (%) of portions comprising the high polymer (C) dispersed in portions comprising the thermoplastic elastomer (B) was determined based on the total portions comprising the high polymer (C) The resulting volume fractions (%) are shown in "Polymer (C) in (B) volume fraction (%)" in Table 1.

The IZOD impact strength (in accordance with ASTM D 256) of the test pieces [IZOD impact test pieces (notched) in accordance with ASTM D 256] was determined at 23° C., 0° C., −20° C., and −40° C. The results are shown in "IZOD impact strength" in Table 1.

TABLE 1

|  | Example | | | Comparative Example | | |
|---|---|---|---|---|---|---|
|  | 1 | 2 | 3 | 1 | 2 | 3 |
| Structure | Capsule | Capsule | Capsule | Contact | Separate | Separate |
| Independent elastomer (B) volume fraction (%) | 10 | 20 | 10 | 90 | 100 | 95 |
| Polymer (C) in (B) volume fraction (%) | 100 | 100 | 100 | 15 | 0 | 5 |
| IZOD impact strength (J/m) | | | | | | |
| 23° C. | 400 | 300 | 300 | 80 | 100 | 50 |
| 0° C. | 320 | 270 | 280 | 40 | 95 | 40 |
| −23° C. | 280 | 250 | 260 | 20 | 85 | 30 |
| −40° C. | 120 | 100 | 110 | 10 | 70 | 20 |

Table 1 shows that the test pieces according to Examples 1 to 3 having "Capsule" structures have high IZOD impact strength and have excellent impact resistance at individual temperatures. In addition, they have IZOD impact strength at a low temperature of −40° C. equal to or higher than that at 23° C. of the comparative examples and have very satisfactory low-temperature impact resistance.

INDUSTRIAL APPLICABILITY

As is described above, the present invention can markedly improve impact strength at low temperatures without deterioration in inherent excellent physical properties of thermoplastic resins. Molded articles comprising the thermoplastic resin composition material of the present invention are therefore useful typically as shuttle cocks and other sporting goods, shoes, tubes, hoses, gears, and other automobile or machine parts, and electric appliance parts.

The invention claimed is:

1. A thermoplastic resin composition material comprising a resin portion (a) made of a thermoplastic resin (A); elastomer portions (b) made of a thermoplastic elastomer (B), the thermoplastic elastomer (B) having substantially no compatibility with the thermoplastic resin (A) and having a glass transition temperature of lower than or equal to −40° C.; and polymer portions (c) made of a high polymer (C), the high polymer (C) having substantially no compatibility with the thermoplastic resin (A) and the thermoplastic elastomer (B), having a glass transition temperature or crystallization temperature of lower than or equal to −50° C., and having a viscosity at 40° C. of from 0.1 to 200000 cP, wherein the material has a structure in which the elastomer portions (b) are dispersed in the resin portion (a) and the polymer portions (c) are dispersed in the elastomer portions (b).

2. The thermoplastic resin composition material according to claim 1, wherein 0.5 to 100 parts by weight of the thermoplastic elastomer (B) and 0.01 to 10 parts by weight of the high polymer (C) are contained relative to 100 parts by weight of the thermoplastic resin (A).

3. The thermoplastic resin composition material according to claim 1 or 2, wherein the percentage of elastomer portions (b) encapsulating the polymer portions (c) dispersed therein is equal to or more than 30% by volume based on the total amount of the elastomer portions (b), and wherein the percentage of polymer portions (c) dispersed in the elastomer portions (b) is equal to or more than 50% by volume based on the total amount of the polymer portions (c).

4. The thermoplastic resin composition material according claim 1 or 2, wherein the thermoplastic resin (A) is a polyamide or a polyester.

5. The thermoplastic resin composition material according to claim 1 or 2, wherein the thermoplastic elastomer (B) is an olefinic elastomer or a styrenic elastomer.

6. The thermoplastic resin composition material according to claim 1 or 2, wherein the high polymer (C) is a polyether.

7. A molded article made from the thermoplastic resin composition material as claimed in claim 1 or 2.

8. A molded article made from the thermoplastic resin composition material as claimed in claim 3.

9. A molded article made from the thermoplastic resin composition material as claimed in claim 4.

10. A molded article made from the thermoplastic resin composition material as claimed in claim 5.

11. A molded article made from the thermoplastic resin composition material as claimed in claim 6.

* * * * *